(12) United States Patent
Tzeng et al.

(10) Patent No.: US 10,336,447 B2
(45) Date of Patent: Jul. 2, 2019

(54) FOLDING PROPROTOR GIMBAL LOCK AND BLADE LOCK MECHANISM

(71) Applicant: Bell Helicopter Textron Inc., Fort Worth, TX (US)

(72) Inventors: Chyau-Song Tzeng, Arlington, TX (US); Troy Cyril Schank, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 605 days.

(21) Appl. No.: 14/957,321

(22) Filed: Dec. 2, 2015

(65) Prior Publication Data

US 2016/0152329 A1 Jun. 2, 2016

Related U.S. Application Data

(60) Provisional application No. 62/086,637, filed on Dec. 2, 2014.

(51) Int. Cl.
*B64C 27/54* (2006.01)
*B64C 29/00* (2006.01)
*B64C 11/28* (2006.01)
*B64C 27/30* (2006.01)

(52) U.S. Cl.
CPC .......... *B64C 29/0033* (2013.01); *B64C 11/28* (2013.01); *B64C 27/30* (2013.01)

(58) Field of Classification Search
CPC .......... B64C 11/28; B64C 27/30; B64C 27/57
See application file for complete search history.

(56) References Cited

U.S. PATENT DOCUMENTS

| 3,515,500 | A | | 6/1970 | Nachod | |
|---|---|---|---|---|---|
| 3,528,630 | A | | 9/1970 | Ferris et al. | |
| 3,592,412 | A | * | 7/1971 | Glatfelter | B64C 29/0033 244/7 A |
| 3,764,229 | A | * | 10/1973 | Ferris | B64C 27/50 416/114 |
| 3,771,924 | A | * | 11/1973 | Buchstaller | B64C 27/54 244/7 A |
| 3,874,817 | A | * | 4/1975 | Ferris | B64C 27/50 416/143 |
| 4,436,483 | A | * | 3/1984 | Watson | B64C 27/50 416/143 |
| 6,622,962 | B1 | | 9/2003 | White | |

(Continued)

OTHER PUBLICATIONS

EP Search Report; Application No. 18154237.4; EPO; dated May 9, 2018.

(Continued)

*Primary Examiner* — Kayla McCaffrey
(74) *Attorney, Agent, or Firm* — Lightfoot & Alford PLLC

(57) ABSTRACT

A gimbal lock mechanism for a rotor hub can include a cam member having a cuff lock lobe and a gimbal lock lobe. The cam member is configured so that rotation can cause the first cuff lobe to become adjacent to the root end of the rotor blade and at the same time causes the gimbal lock lobe to become adjacent to a gimbal so as to inhibit gimbaling of the gimbal. A first moveable pin can be located on the root end portion of the rotor blade and inserted into the cuff lock lobe to prevent pitch change of the rotor blade.

17 Claims, 14 Drawing Sheets

(56) References Cited

U.S. PATENT DOCUMENTS

| | | | | |
|---|---|---|---|---|
| 6,824,096 B2* | 11/2004 | Zoppitelli | ............... | B64C 27/28 244/17.25 |
| 7,037,072 B2* | 5/2006 | Carson | ..................... | F03B 1/00 416/1 |
| 7,695,249 B2* | 4/2010 | Krauss | ................... | B64C 27/10 416/134 A |
| 8,376,264 B1* | 2/2013 | Hong | ..................... | B64C 27/26 244/17.23 |
| 8,998,125 B2* | 4/2015 | Hollimon | ............... | B64C 27/28 244/6 |
| 10,029,783 B2 | 7/2018 | Schank et al. | | |
| 2006/0067822 A1* | 3/2006 | D'Anna | ................. | B64C 27/50 416/98 |
| 2008/0112808 A1* | 5/2008 | Schmaling | ............. | B64C 27/10 416/134 A |
| 2017/0144746 A1 | 5/2017 | Schank et al. | | |

OTHER PUBLICATIONS

EP Exam Report; Application No. 18154237.4; EPO; dated May 28, 2018.

\* cited by examiner

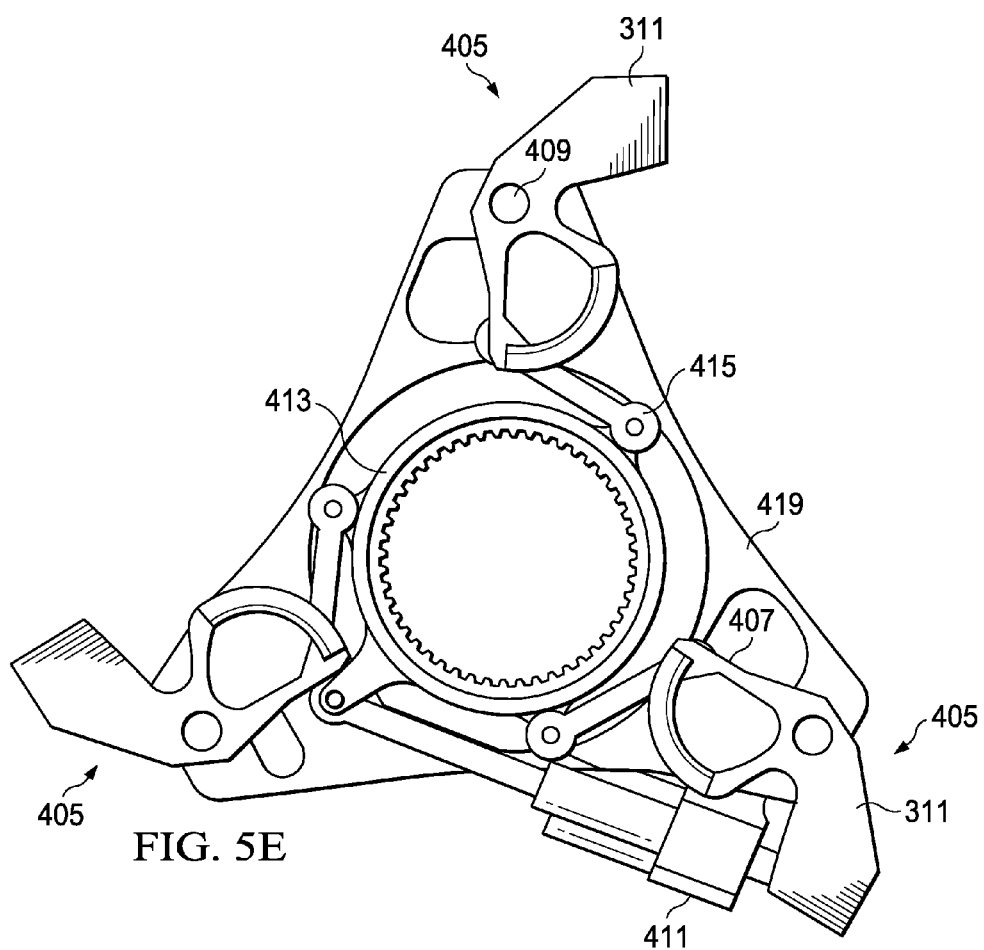

FOLDING PROPROTOR GIMBAL LOCK AND BLADE LOCK MECHANISM

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

FIG. 5E is a top view of a gimbal lock mechanism with the gimbal being locked and prevented from flapping, according to one example embodiment.

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
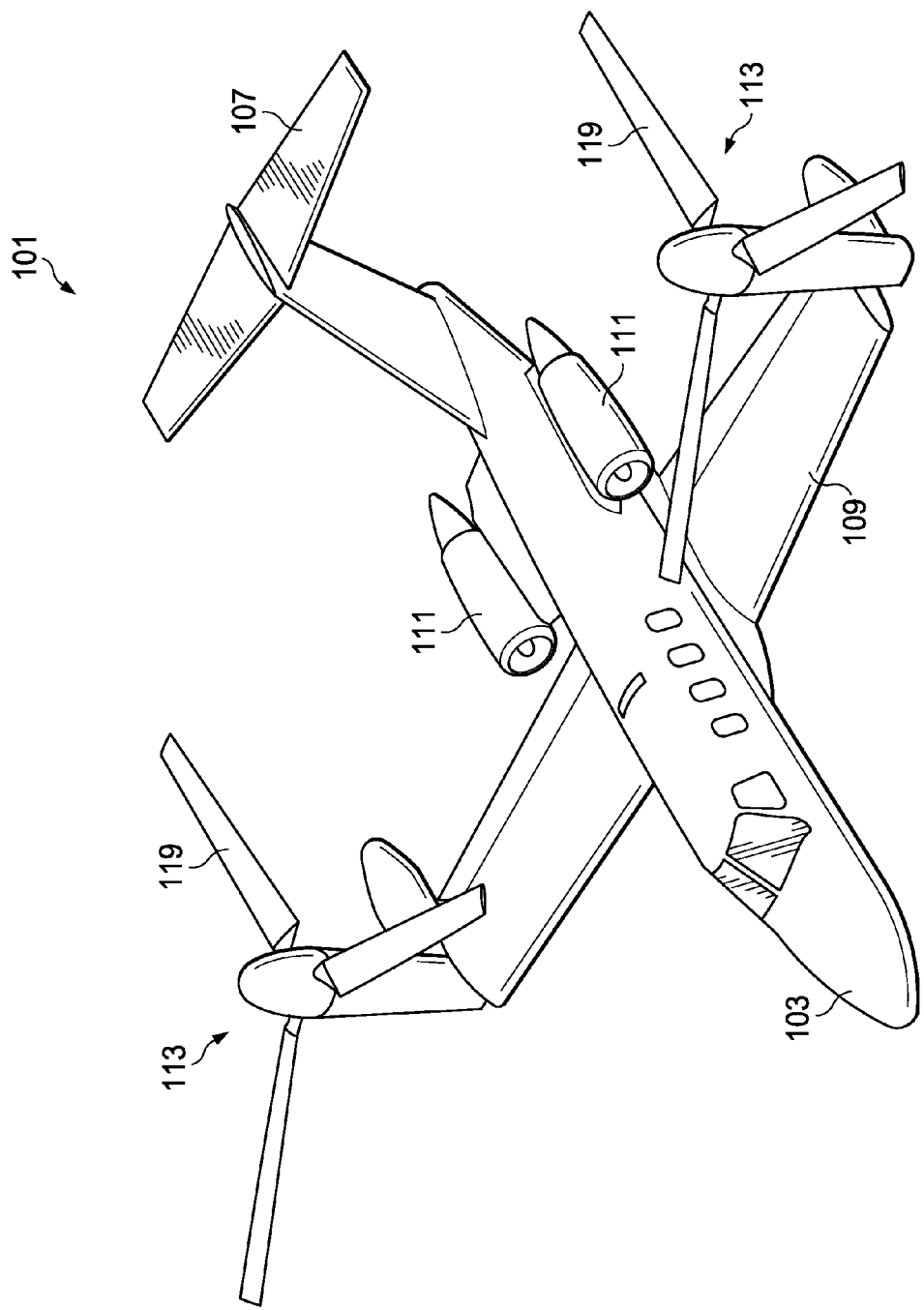
FIG. 1 is a perspective view of a tiltrotor aircraft in helicopter mode, according to one example embodiment.
Figure 2:
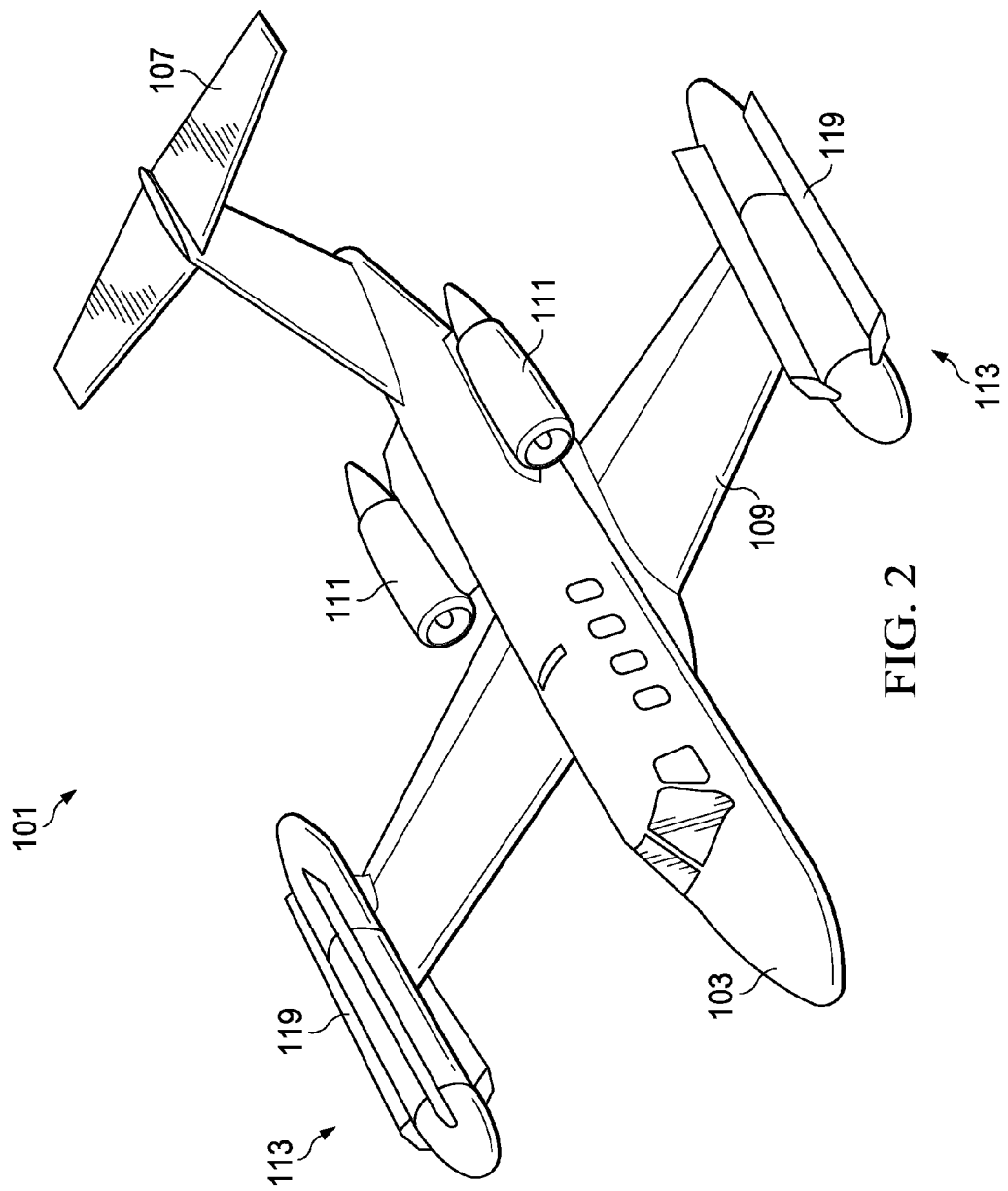
FIG. 2 is a perspective view of a tiltrotor aircraft in airplane mode, according to one example embodiment.
Figure 3A:
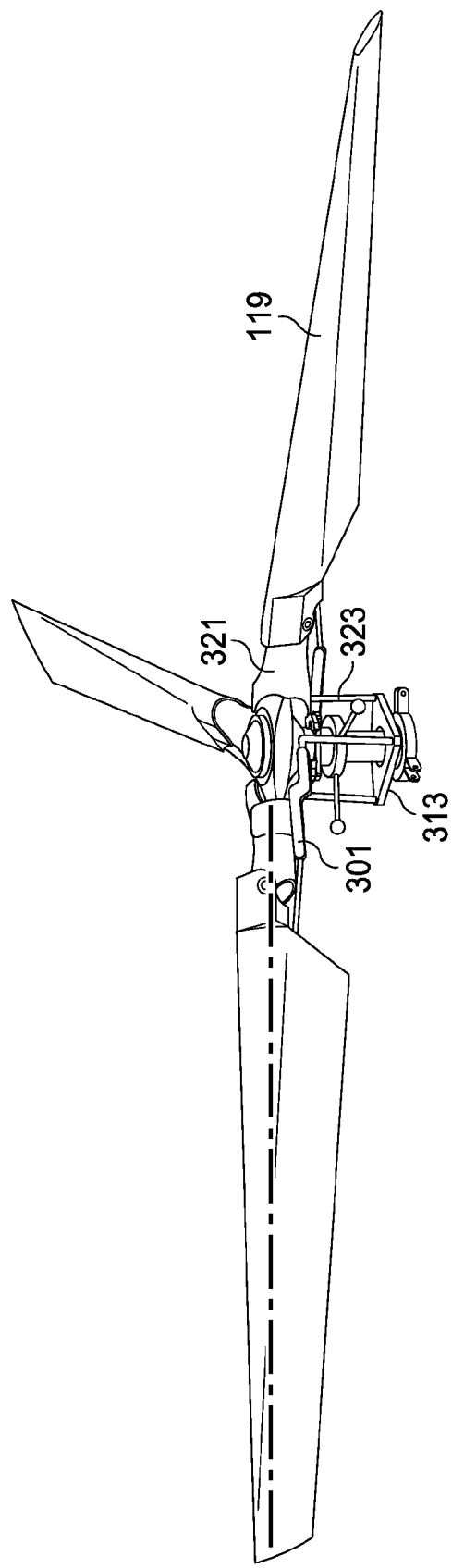
FIG. 3A is an isometric view of a proprotor with the rotor blades in normal pitch, according to one example embodiment.
Figure 3B:
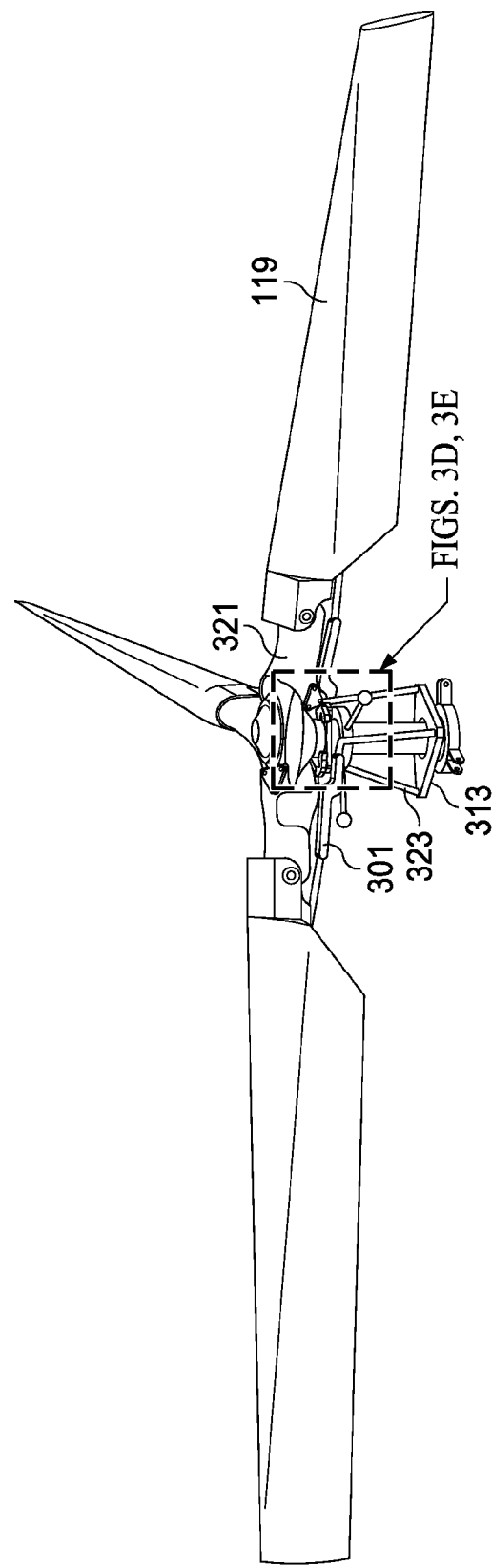
FIG. 3B is an isometric view of a proprotor with the rotor blades feathered, according to one example embodiment.
Figure 3C:
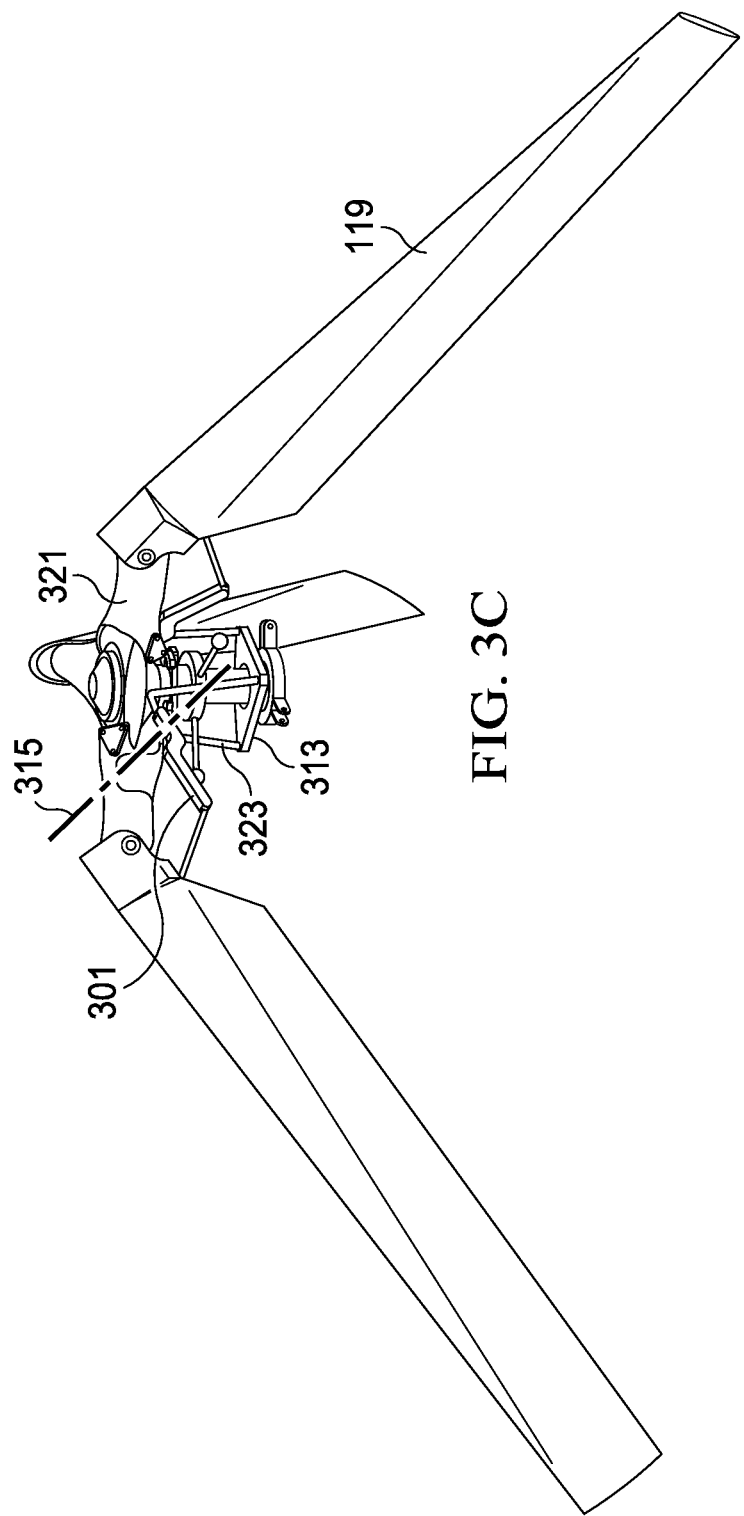
FIG. 3C is an isometric view of a proprotor with the rotor blades being folded, according to one example embodiment.
Figure 3D:
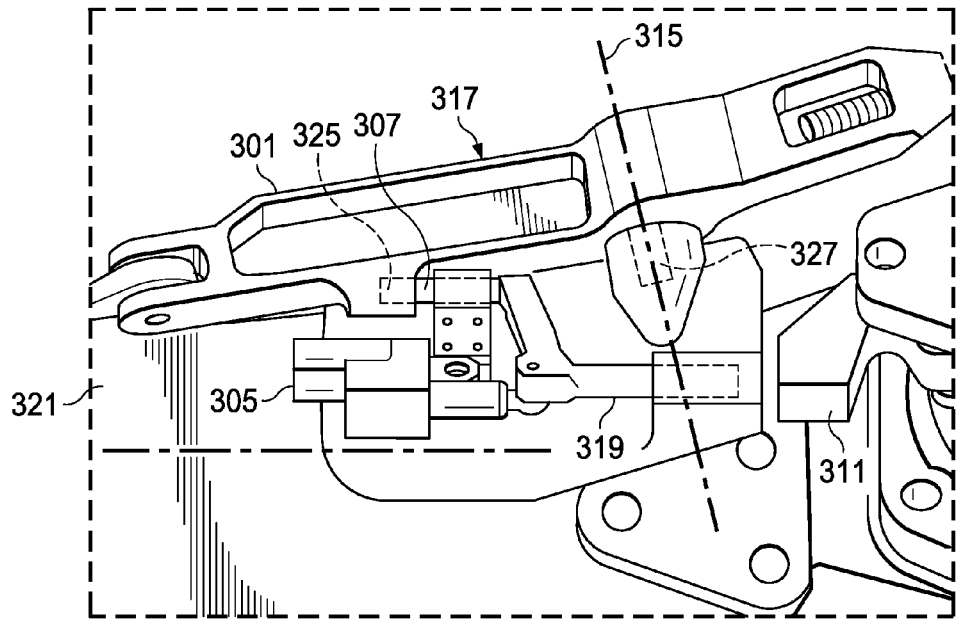
FIG. 3D is an isometric view of a blade lock mechanism in normal proprotor mode, according to one example embodiment.
Figure 3E:
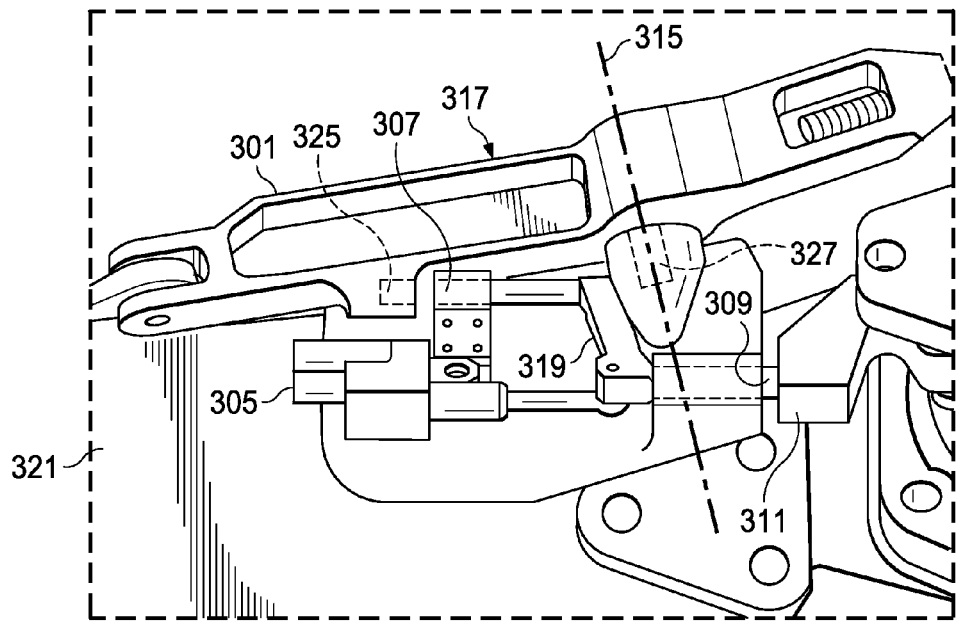
FIG. 3E is an isometric view of a blade lock with the rotor blade pitch locked out, according to one example embodiment.
Figure 4A:
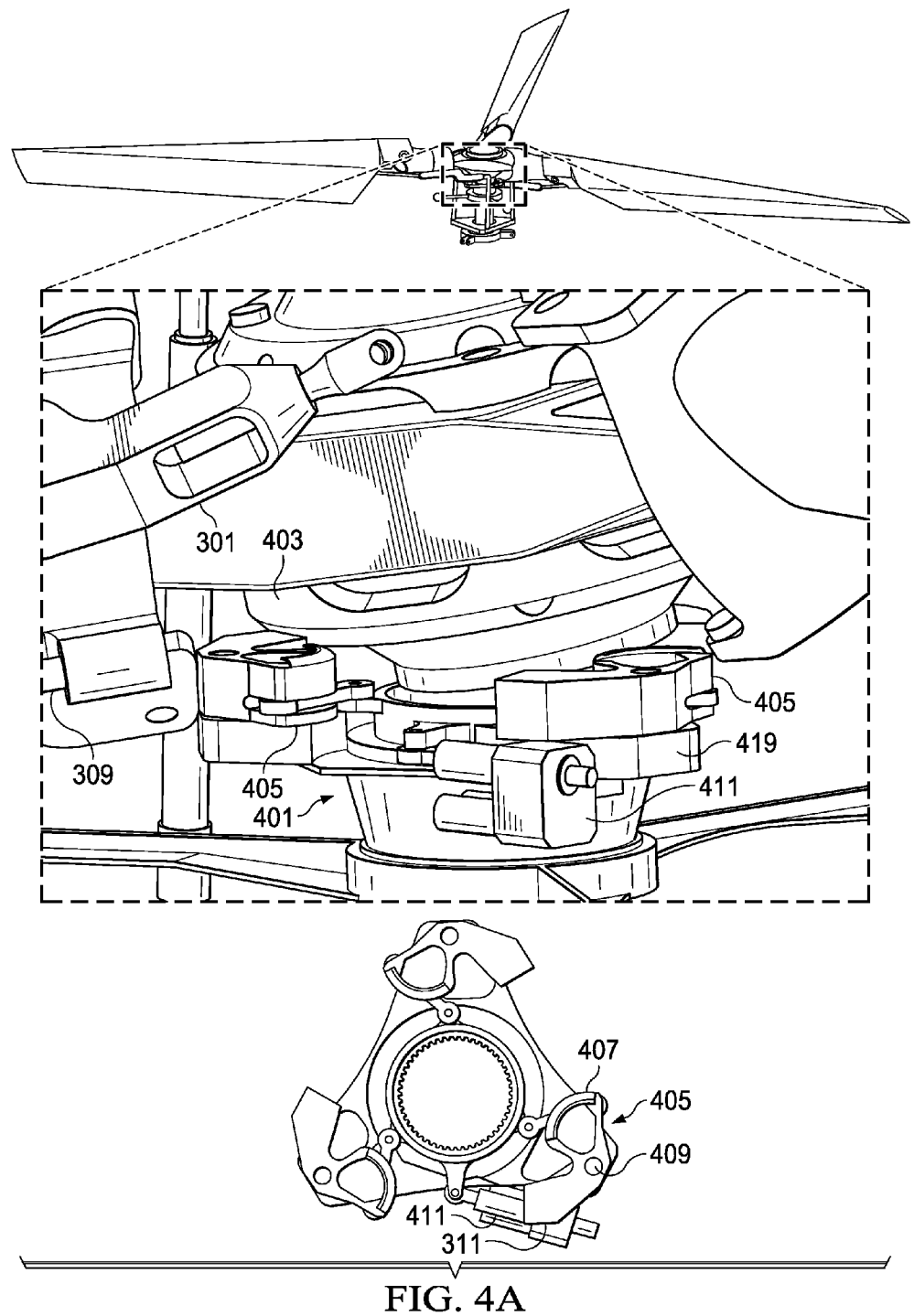
FIG. 4A is an isometric, detail isometric, and top view of a gimbal lock mechanism with the gimbal being allowed to flap, according to one example embodiment.
Figure 4B:
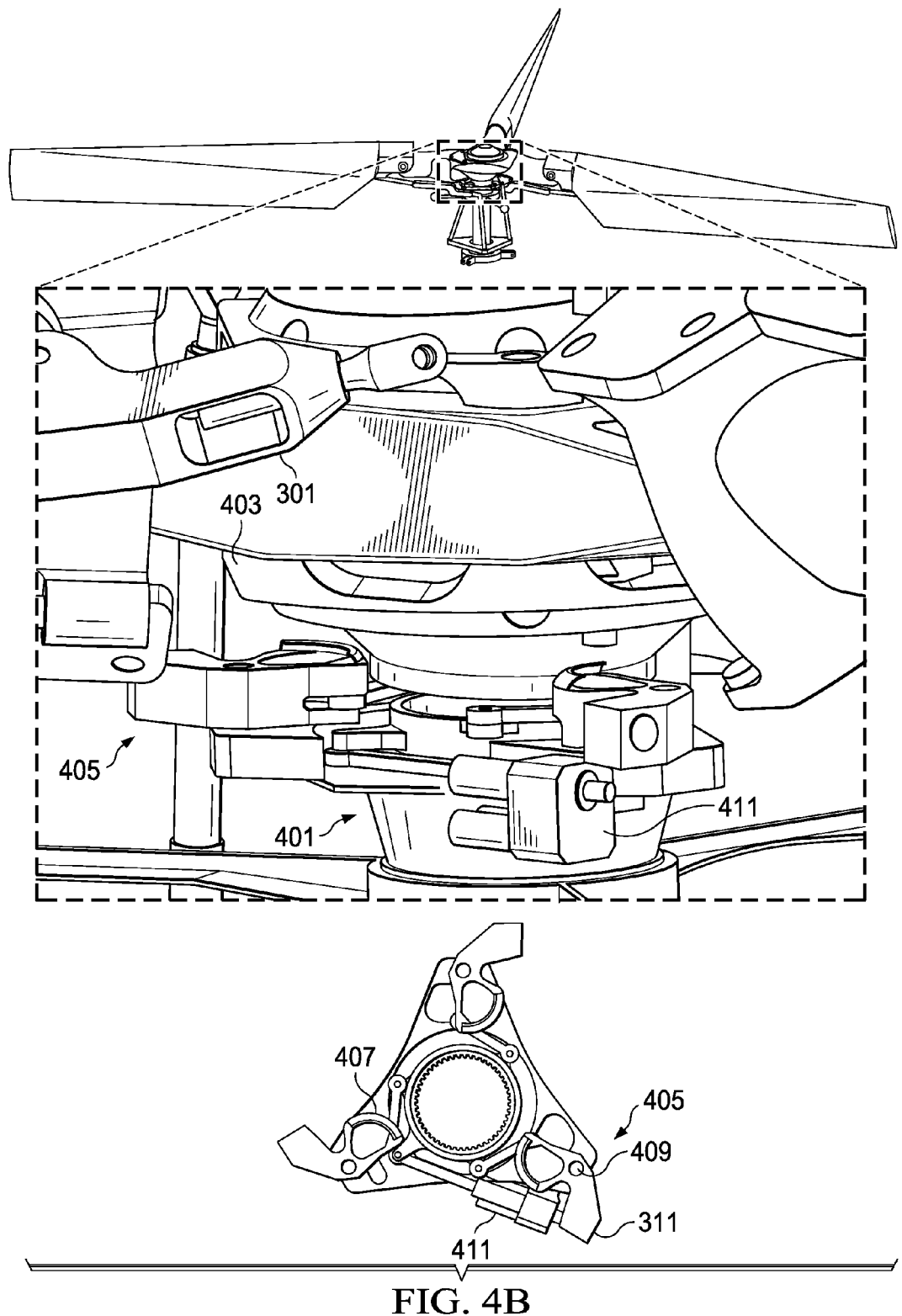
FIG. 4B is an isometric, detail isometric, and top view of a gimbal lock mechanism with the gimbal being prevented from flapping, according to one example embodiment.
Figure 5A:
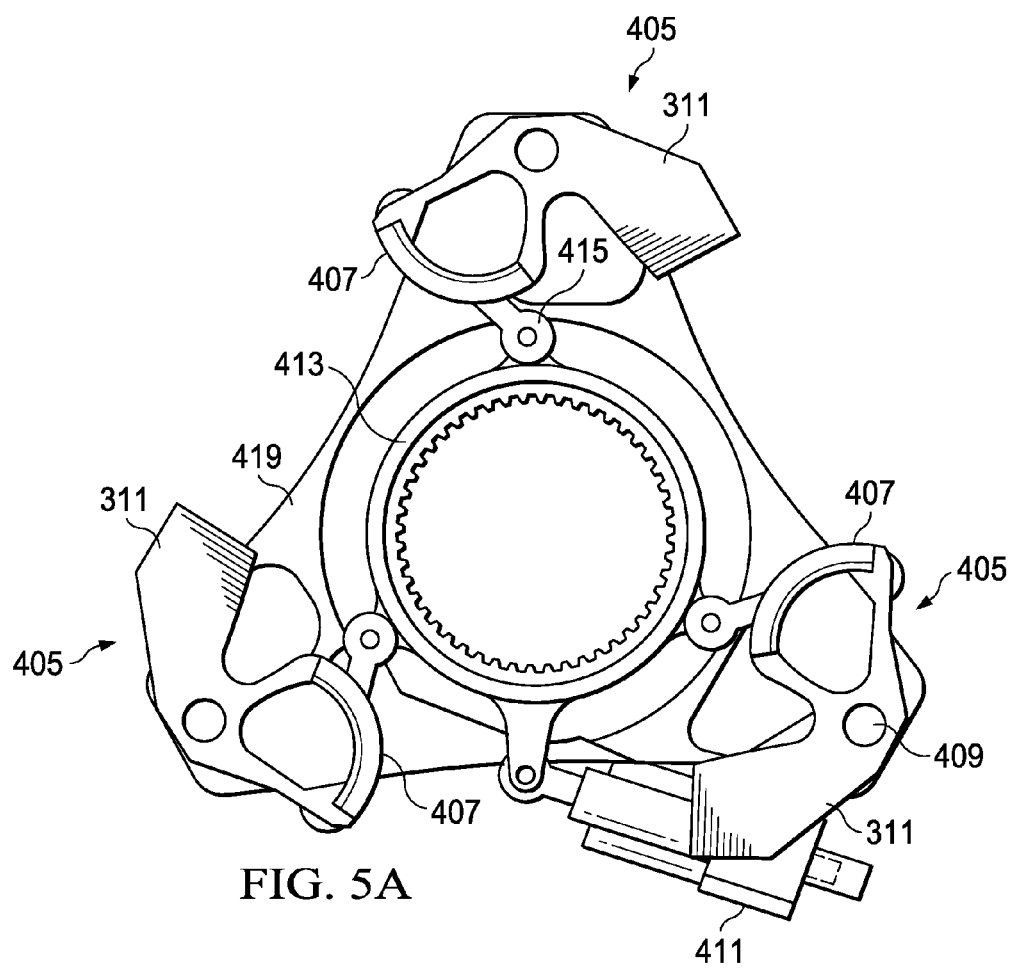
FIG. 5A is a top view of a gimbal lock mechanism with the gimbal being allowed to flap, according to one example embodiment.
Figure 5B:
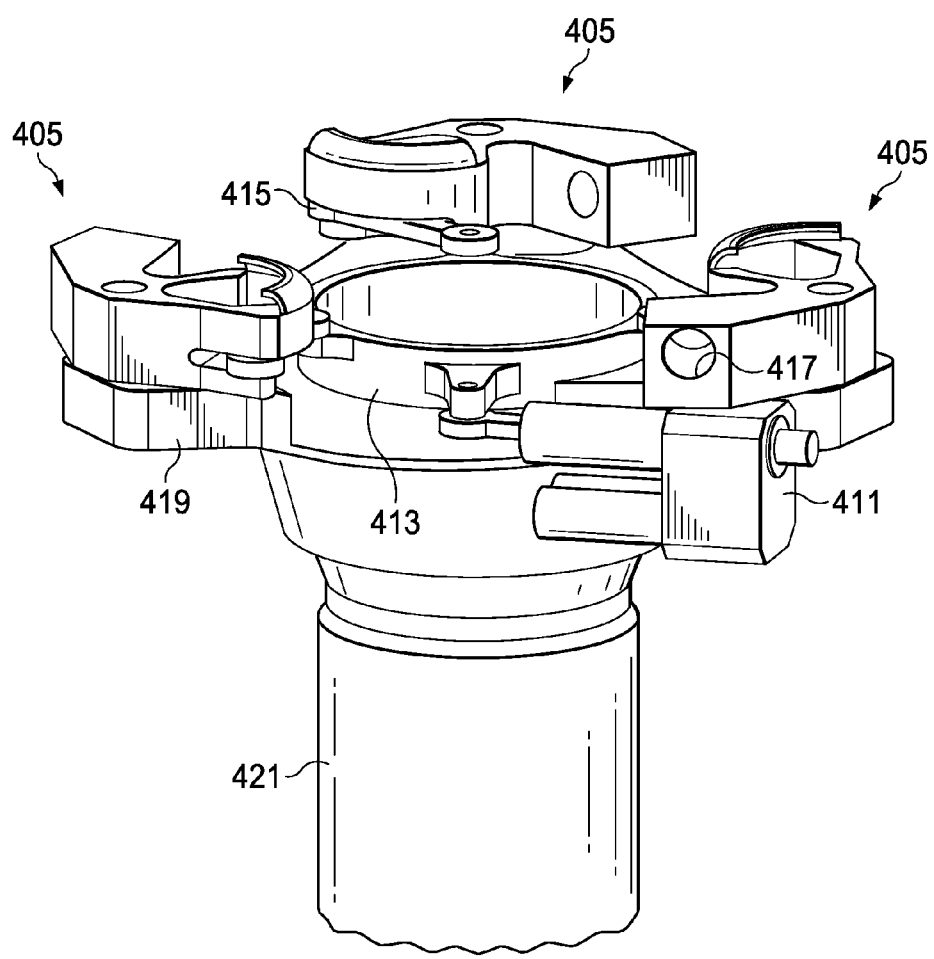
FIG. 5B is an isometric view of a gimbal lock mechanism with the gimbal being allowed to flap, according to one example embodiment.
Figure 5C:
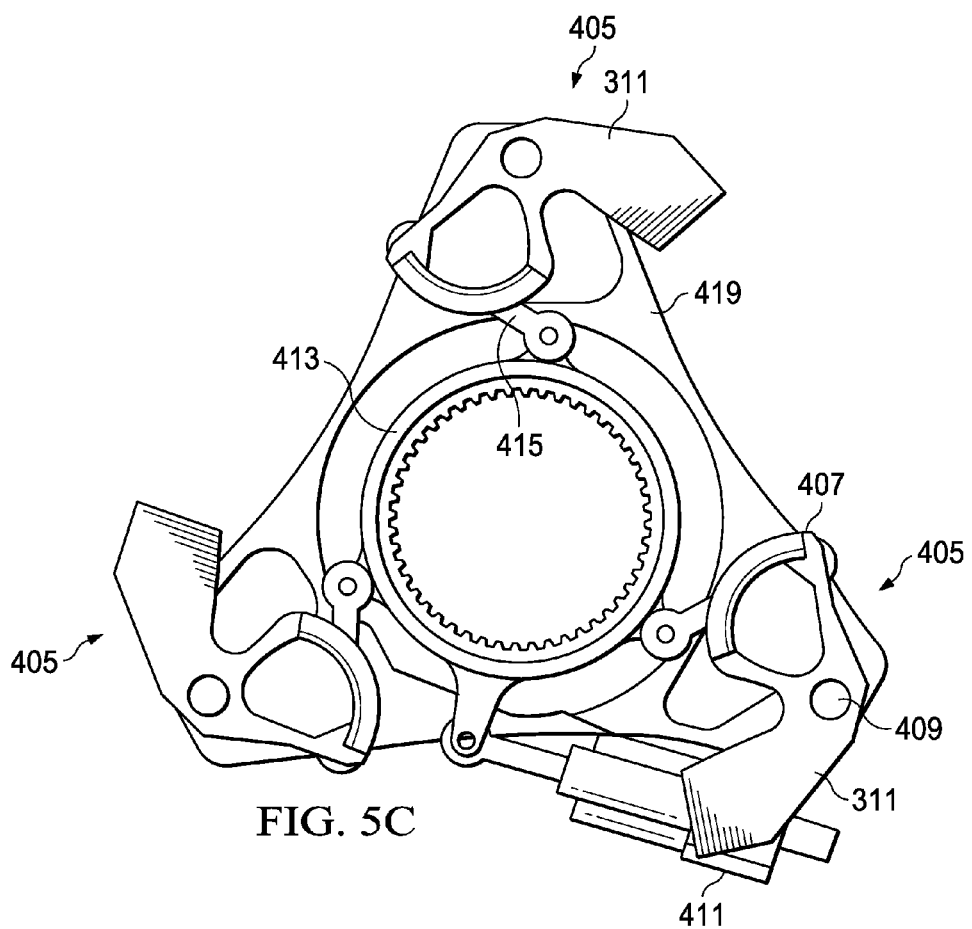
FIG. 5C is a top view of a gimbal lock mechanism during transition, according to one example embodiment.
Figure 5D:
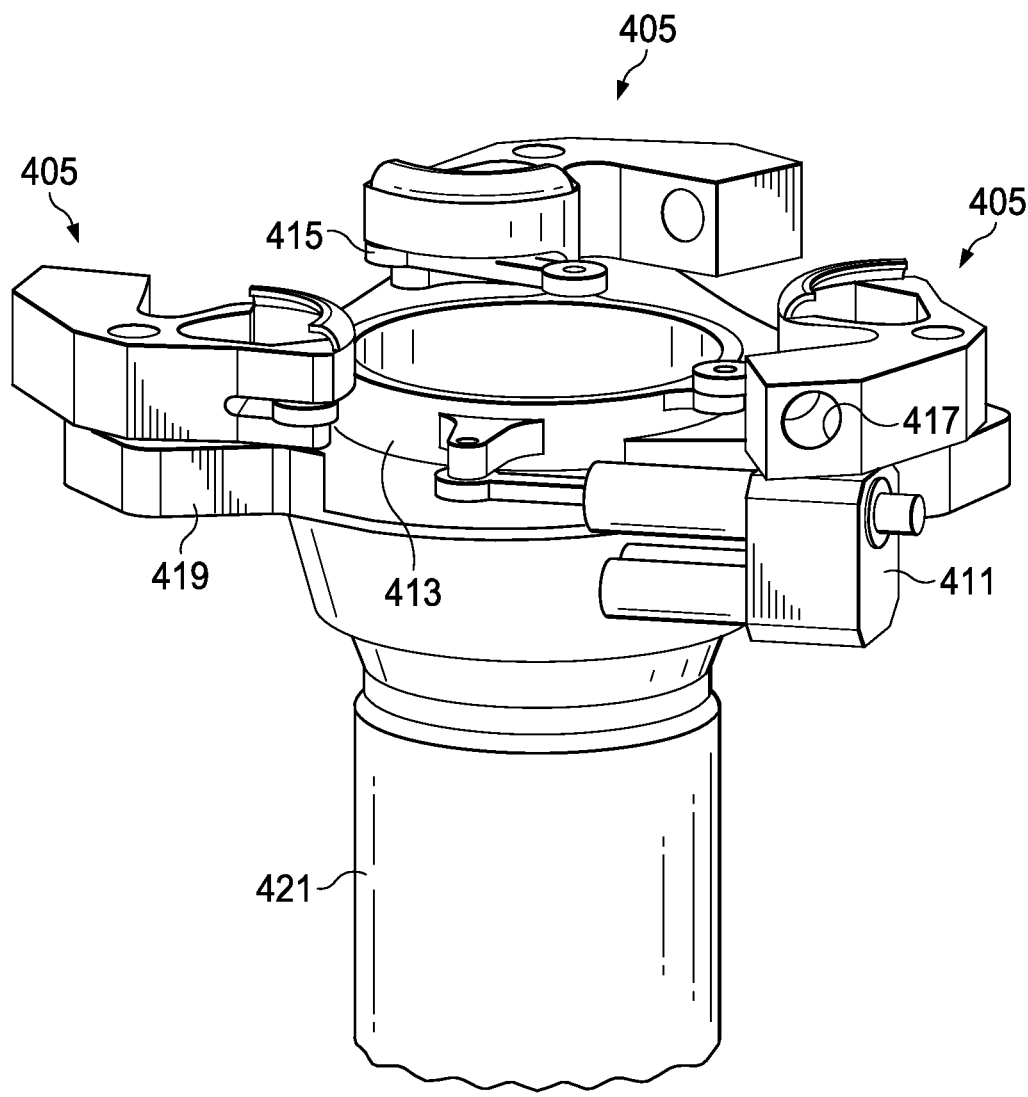
FIG. 5D is an isometric view of a gimbal lock mechanism during transition, according to one example embodiment.
Figure 5F:
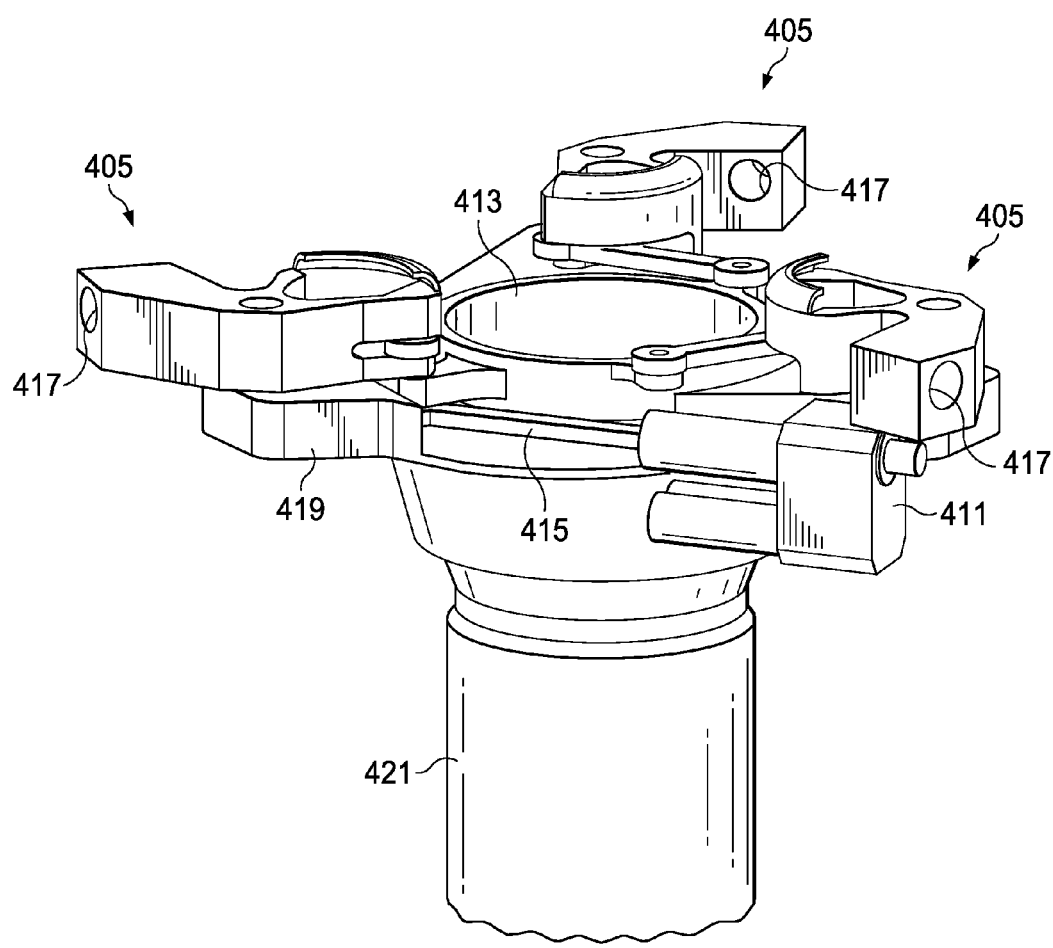
FIG. 5F is an isometric view of a gimbal lock mechanism with the gimbal being locked and prevented from flapping, according to one example embodiment.

Referring to FIGS. 1 and 2 in the drawings, a tiltrotor aircraft 101 is illustrated. Tiltrotor aircraft 101 can include a fuselage 103, a tail member 107, a wing 109, engines 111, and proprotors 113. Each proprotor 113 includes a plurality of rotor blades 119, associated therewith. The position of proprotors 113, as well as the pitch of rotor blades 119, can be selectively controlled in order to selectively control direction, thrust, and lift of tiltrotor aircraft 101.

Tiltrotor aircraft can fly in at least three modes, including helicopter mode, proprotor mode, and airplane mode. FIG. 1 illustrates tiltrotor aircraft 101 in helicopter mode, in which proprotors 113 are positioned substantially vertical to provide a lifting thrust. FIG. 2 illustrates tiltrotor aircraft 101 in an airplane mode, in which proprotors 113 are positioned substantially horizontal with rotor blades 119 folded backwards, the forward thrust being provided by engines 111, the lifting force being supplied by wing 109. Further, tiltrotor 101 can fly in proprotor mode (not shown), in which forward thrust is provide by proprotors 113 oriented substantially horizontally. It should be appreciated that tiltrotor aircraft can be operated such that proprotors 113 are selectively positioned between proprotor mode and helicopter mode, which can be referred to as a conversion mode. Engines 111 are convertible engines that can selectively provide shaft power to proprotors 113 and provide thrust power as a turbo fan engine.

Further, proprotors 113 are illustrated in the context of tiltrotor aircraft 101; however, proprotors 113 can be implemented on other tiltrotor aircraft. For example, an alternative embodiment may include a quad tiltrotor that has an additional wing member aft of wing 109; the additional wing member can have additional proprotors similar to proprotors 113. In another embodiment, proprotors 113 can be used with an unmanned version of tiltrotor aircraft 101. Further, proprotors 113 can be integrated into a variety of tiltrotor aircraft configurations.

A tiltrotor aircraft that uses only proprotors 113 for forward propulsion in proprotor mode is fundamentally limited in forward speed by the proprotor propulsion efficiency due to compressibility (Mach) effects. Higher speeds can be obtained by stopping the rotors and folding them in combination with using an alternative propulsion method, such as a turbofan engine 111. When proprotor 113 is a gimbaled (flapping) proprotor, the proprotor 113 becomes subject to high flapping angles when the proprotor speed (RPM) is slowed to a stop since the centrifugal forces are lower at lower proprotor speeds. In order to prevent the proprotor 113 from from gimbaling too much under large loads and damaging itself, i.e. mast bumping, a locking mechanism locks out the flapping degree of freedom.

Referring to FIGS. 3A-3E, the embodiments of the present disclosure provide a mechanism to 'lock' the gimbal degree of freedom to prevent flapping at lower proprotor RPMs, but allow flapping at higher RPMs. The embodiments of the present disclosure also provides a means to lock the blade feather or pitching motion out, when the gimbal is locked, by providing a rigid connection point in proximity to a cuff 321 of the rotor blade 119, but moves the rigid connection away from the cuff 321 of the rotor blade 119 to allow sufficient clearance when the gimbal is unlocked and allowed to flap.

Still referring to FIGS. 3A-3E, a folding proprotor transition sequence is illustrated. A pitch horn 301 functions to not only change the pitch of the rotor blade 119 while in proprotor mode, but also as the blade fold mechanism when folding the rotor blades 119 to convert into airplane mode. During proprotor mode, a pin 303 couples pitch horn 301 to a portion 307 on a cuff 321 of the rotor blade 119 so that up/down movements of a swashplate 313 change the pitch of the rotor blade 119 via a plurality of pitch links 323. However, when actuator 305 is actuated, pin 303 decouples the pitch horn 301 from the portion 307 of the rotor blade 119 and simultaneously engages a pin 309 to a cuff lock lobe 311, which prevents a pitch change in rotor blade 119. Next, an upward movement of the swashplate 313 causes the rotor blades 119 to fold backwards about a crank axis of rotation 315, thus allowing the pitch horn 301 to be used for both rotor blade pitch change during proprotor mode, as well as for folding the rotor blades 119 when converting to airplane mode. Pitch horn 301 is rotatably coupled to rotor blade 119 with a spindle 327 that defines the crank axis of rotation 315.

In the illustrated embodiment, pin 303 and pin 309 are part of a single lock device 319 that is coupled to actuator 305 such that actuation of lock device 319 simultaneously locks out pitch change motion by insertion of pin 309 into cuff lock lobe 311, and unlocks a fold crank 317 by removal of pin 303 from pitch horn 301, which allows the rotor blades 119 to fold for high speed flight configuration in airplane mode. Conversely, when the rotor blades 119 unfold into proprotor mode, the translation of lock device 319 removes pin 309 from cuff lock lobe 311 so as to un-lock the pitch degree of freedom, and simultaneously inserts pin 303 into a hole 325 in pitch horn 301 so as to lock out the fold degree of freedom. The lock device 319 is shaped to allow lock engagement in different locations on the blade root. The lock device 319 is affected by the actuator 305 located on the cuff portion 321 on the root end of rotor blade 119. Each rotor blade 119 and cuff 321 has an actuator 305 and lock device 319.

Referring also to FIGS. 4A, 4B, and 5A-5F, a gimbal lock mechanism 401 is illustrated. Gimbal lock mechanism 401 includes a plurality of cams 405 each having the cuff lock lobe 311 and a gimbal lock lobe 407 that can selectively rotate about a hinge 409 when selectively actuated by an actuator 411. Cams 405 are rotatably coupled to a housing 419. Housing 419 is coupled to the rotor mast 421 so as to concentrically rotate with the rotor mast 421. Each cam 405 is also coupled together by a ring 413 and linkages 415 such that only a single actuator 411 can rotate all the cams 405 by rotating ring 413. Actuator 411 is secured to housing 419.

Each gimbal lock lobe 407 can be selectively rotated into close proximity with the gimbal 403 to physically restrain the gimbal 403 so as to prevent the gimbal 403 from tilting. In the illustrated embodiment, three gimbal lock lobes 407 are used to secure gimbal 403 and prevent gimbal 403 from flapping. The cams 405 are configured to allow gimbal flapping when the cams 405 are in one rotational position, and prevent or constrain the gimbal hub 403 in another rotational position. One advantageous feature of the gimbal lock mechanism 401 is that the cuff lock lobe 311 is integral to the gimbal lock lobes 407 of the cams 405 such that the cuff lock lobes 311 are only in close proximity with the root ends of the rotor blades 119 when the gimbal 403 is locked and prevented from tilting. This prevents undesired interference between rotor blades 119 and the cuff lock lobes 311 during proprotor operation which involves gimbaling (flapping).

The cams 405 can have a shape with a feature (a 'lock lobe') that rotates in proximity to the blade/cuff root, when the cams 405 are in the locked position, to allow the blade pitch to be locked out by the insertion of pin 309 into a mating aperture 417. Pitch lock-out is important in order to fold the blades with the swashplate actuators.

In the illustrated embodiment, the gimbal lock lobe 407 is illustrated with an arcuate geometry that is configured to mate with a similar mating geometry of the gimbal 403 to prevent flapping. It should be appreciated that the exact mating geometries of gimbal 403 and gimbal lock lobe 407 is implementation specific and not limited to an arcuate geometry. Gimbal lock lobe 407 will contact gimbal 403 if gimbal 403 attempts to gimbal or flap, therefore a compliant layer, such as an elastomer, can be used therebetween.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A gimbal lock mechanism for a rotor hub, the gimbal lock mechanism comprising:
   a cam member having a cuff lock lobe and a gimbal lock lobe, the cam member rotatable relative to a housing;
   a rotor blade having a root end portion;
   a first pin located on the root end portion of the rotor blade; and
   an aperture located in the cuff lock lobe;
   wherein the cam member is configured so that rotation can cause the cuff lock lobe to become adjacent to the root end portion of the rotor blade and at the same time causes the gimbal lock lobe to become adjacent to a gimbal and inhibit gimbaling of the gimbal.

2. The gimbal lock mechanism according to claim 1, wherein an insertion of the first pin into the aperture of the cuff lock lobe prevents a pitch change of the rotor blade.

3. The gimbal lock mechanism according to claim 1, further comprising:

a first actuator coupled to the cam member.

4. The gimbal lock mechanism according to claim 3, wherein the first actuator is coupled to the cam member with a ring member and a linkage.

5. The gimbal lock mechanism according to claim 1, further comprising:
a second actuator coupled to the first pin.

6. The gimbal lock mechanism according to claim 1, further comprising:
a rotor mast;
wherein the housing is concentric with the rotor mast.

7. The gimbal lock mechanism according to claim 1, further comprising:
wherein the cam member is configured to rotate about a cam axis that is parallel to a rotor mast axis of rotation.

8. The gimbal lock mechanism according to claim 1, further comprising:
a pitch horn rotatably coupled to the root end portion of the rotor blade; and
a second pin integral to the first pin;
wherein insertion of the first pin into the aperture of the cuff lock lobe results in the second pin being removed from a second aperture in the pitch horn which frees the pitch horn to rotate about a crank axis of rotation during a folding of the rotor blade.

9. The gimbal lock mechanism according to claim 1, further comprising:
a pitch horn rotatably coupled to the root end portion of the rotor blade; and
a second pin integral to the first pin;
wherein insertion of the first pin into the aperture of the cuff lock lobe results in the second pin being removed from a second aperture in the pitch horn such that a raising of a swashplate causes the pitch horn to rotate about a crank axis of rotation and fold the rotor blade.

10. An aircraft comprising:
a rotor mast;
a rotor blade;
a pitch horn coupled to a root end portion of the rotor blade;
a cam member having a cuff lock lobe and a gimbal lock lobe;
a pin located on the root end portion of the rotor blade; and
an aperture located in the cuff lock lobe;
wherein the cam member is configured so that actuation of the cam member about a first direction can cause the cuff lock lobe to travel away from the root end portion of the rotor blade to prevent interference of the cuff lock lobe and the root end portion of the rotor blade during operation of the aircraft.

11. The aircraft according to claim 10, wherein the cam member configured so that actuation of the cam member about the first direction also causes the gimbal lock lobe to travel away from a gimbal member so that the gimbal member is not prevented from flapping by the gimbal lock lobe.

12. The aircraft according to claim 10, wherein the cam member is configured so that actuation of the cam member about a second direction causes the cuff lock lobe to become adjacent to the root end portion of the rotor blade and at the same time cause the gimbal lock lobe to become adjacent to a gimbal and inhibit gimbaling of the gimbal.

13. The aircraft according to claim 10, wherein the pitch horn is coupled to the root end portion of the rotor blade with a spindle and the pin.

14. The aircraft according to claim 13, wherein removal of the pin from the pitch horn allows the pitch horn to selectively rotate about the spindle.

15. A method of converting an aircraft from a proprotor mode to an airplane mode, the method comprising:
actuating a rotor blade to a feathered position with a swashplate;
removing a first pin from a pitch horn which allows the pitch horn to rotate about a crank axis of rotation;
inserting a second pin into a cuff lock lobe which prevents a pitch change of the rotor blade; and
actuating the swashplate which causes the rotor blade to fold.

16. The method according to claim 15, further comprising:
actuating a cam member, the cam member having the cuff lock lobe and a gimbal lock lobe.

17. The method according to claim 16, wherein the gimbal lock lobe physically inhibits a gimbal from flapping.

* * * * *